UNITED STATES PATENT OFFICE.

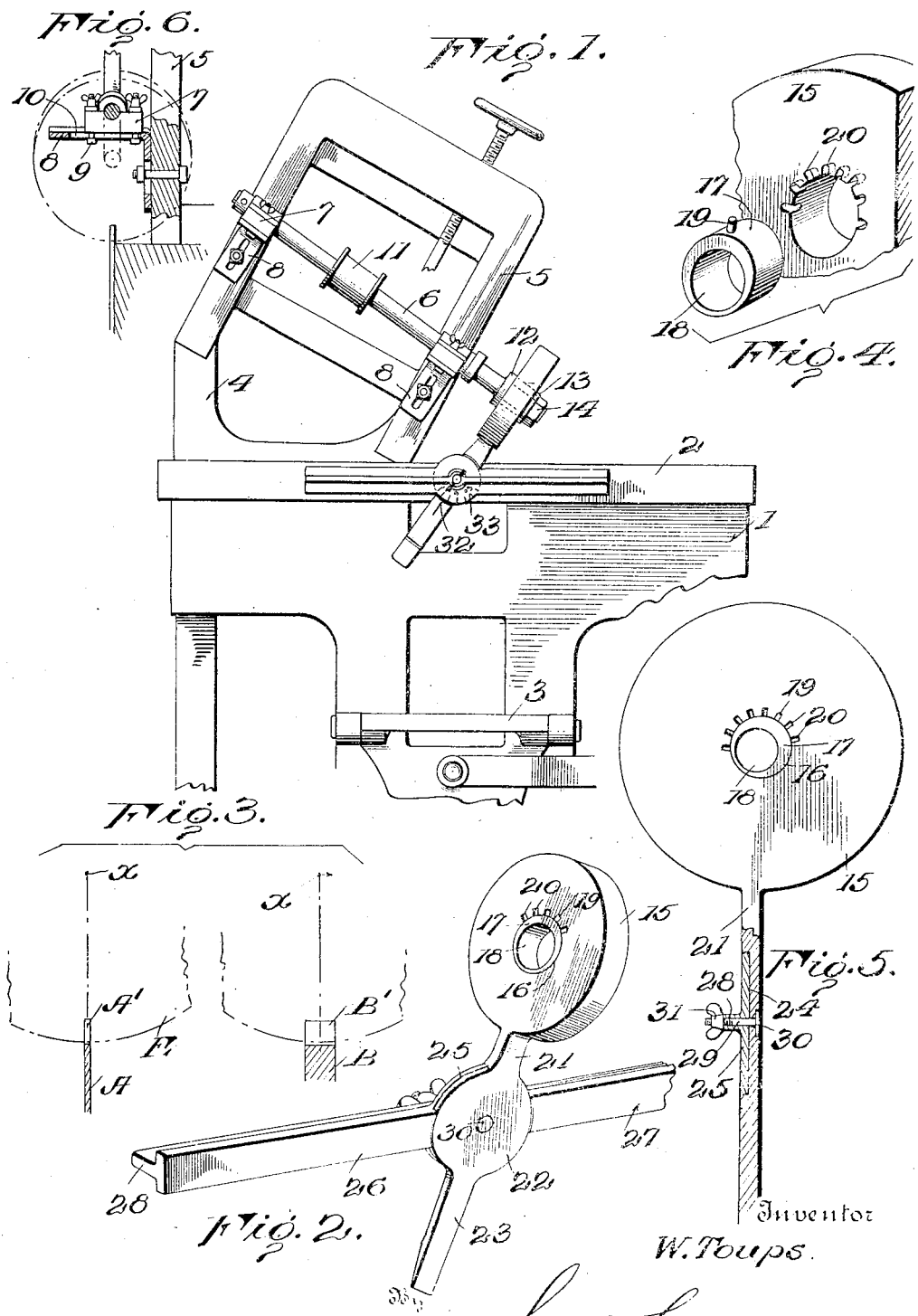

WILSON TOUPS, OF JEANERETTE, LOUISIANA, ASSIGNOR OF ONE-HALF TO H. R. MINVIELLE, OF JEANERETTE, LOUISIANA.

DEVICE FOR SETTING THE SHAFTS OF SAW-GRINDING MACHINES.

1,337,293.

Specification of Letters Patent.

Patented Apr. 20, 1920.

Application filed October 16, 1918. Serial No. 258,431.

*To all whom it may concern:*

Be it known that I, WILSON TOUPS, a citizen of the United States, residing at Jeanerette, in the parish of Iberia and State of Louisiana, have invented certain new and useful Improvements in Devices for Setting the Shafts of Saw-Grinding Machines, of which the following is a specification.

The present invention is a device for setting the shafts of saw grinding machines.

Saw grinding machines embody in general, a bed having a face against which the blade of the saw to be ground is to be disposed, means for clamping the saw against the said face, a rotary shaft, and an emery wheel mounted upon the shaft and arranged in the rotation of the shaft, to act upon the teeth of the saw, the axis of the shaft occupying substantially the same plane as the said face of the bed of the machine. Unless provision is made for accurate adjustment of the shaft, the emery wheel carried thereby will act unevenly upon the teeth. In order for the emery wheel to act evenly upon the teeth it is essential that the axis of the shaft by which it is carried shall occupy a plane midway between the planes of the side faces of the saw blade, and where, in the course of a day, many saws of various thicknesses are to be sharpened, it is obvious that much difficulty is experienced in repeatedly adjusting the emery wheel shaft unless some provision is made for accurately determining when the shaft has been adjusted to the proper position and unless such means shall be adapted to be quickly employed. The present invention, therefore, has as its primary object the provision of a device which may be readily applied to the emery wheel shaft, having been previously adjusted for the proper gage of saw blade, and which will, when brought to position against the face of the bed of the machine, accurately position the shaft so that its bearings may be tightened and the shaft thus maintained at adjustment throughout the operation of sharpening the saw.

A further object of the invention is to provide a device for the purpose stated which may be readily manually adjusted without the use of any tools, which will be simple in its construction, and accurate in the performance of its functions.

In the accompanying drawings:

Figure 1 is a front elevation of the device embodying the present invention applied to the bed and emery wheel shaft of a saw sharpening machine of a well-known type;

Fig. 2 is a perspective view of the device removed from the machine;

Fig. 3 is a view illustrating diagrammatically the adjustments required for two thicknesses of saws;

Fig. 4 is a fragmentary perspective view of the head of the device and the adjustable bushing;

Fig. 5 is a view partly in side elevation and partly in vertical transverse section through the device;

Fig. 6 is a vertical front to rear sectional view illustrating one of the bearings for the emery wheel shaft.

In the drawings the bed of the machine is indicated in general by the numeral 1 and the said bed has a flat forward face 2 against which one face of the blade of the saw is to be disposed during the operation of the machine, the said blade being clamped in place by a clamping device indicated in general by the numeral 3 and which device is in the nature of a clamping jaw adapted to be swung into and out of coactive position with the said face 2 to clamp the saw blade. The head of the machine is indicated by the numeral 4 and is of the ordinary construction and therefore need not be specifically described except to state that the head embodies the usual adjustable section 5 through the adjustment of which the emery wheel and its shaft are fed toward and from the toothed edge of the saw when the saw is in position to be sharpened. The emery wheel shaft is indicated by the numeral 6 and the same is mounted in any suitable type of bearings indicated by the numeral 7, these bearings being supported for example by brackets 8 and adjustably mounted upon the said brackets and adapted to be secured in positions of adjustment more or less spaced from the section 5 of the head 4, as for example by means of bolts 9 carried by the bearings and fitted through slots 10 in the said brackets. This is, of course, only one of many types of bearings which might be provided for the purpose, the sole requirement being a bearing which may be adjusted so as to position the axis of the shaft 6 in any one of a number of planes parallel to the plane of the face 2 of the bed 1 of the machine, and, consequently, I am not to be limited to any particular type of bearing. Also it will be understood that the machine may be a power driven machine or a hand driven machine and that the invention is applicable to substantially any of the ordinary types of saw sharpening machines upon the market. As the particular type of machine illustrated in the drawings is a power driven machine, a belt pulley 11 is fixed upon the shaft 6 for the application of power to the said shaft. The shaft 6 is inclined so that the emery wheel carried thereby will rotate in a plane at the proper angle to the toothed edge of the saw blade to act upon the teeth, and adjacent its lower end the shaft 6 is provided with a collar 12 against which one face of the emery wheel is to be disposed when the wheel is fitted onto this end of the shaft, a washer 13 being removably fitted onto the end of the shaft to bear against the opposite face of the emery wheel and being held in clamping engagement with the wheel by means of a nut 14.

In order that the purpose of the invention may be more readily understood, there are illustrated in Fig. 3 of the drawings two saws, one indicated by the reference letter A and the other by the reference letter B, and there are also illustrated diagrammatically fragments of an emery wheel E, the teeth of the saws being indicated respectively by the reference letters A' and B'. Also in the said figure the axis of the emery wheel in each instance is indicated by the reference letter X. It will be observed by reference to this figure that the saw blade A is relatively thin being for example of standard gage No. 18, whereas the blade B is relatively thick and for example of the standard No. 2. In the case of the blade A which blade is clamped against the face 2 of the bed 1 of the machine, the axis of the emery wheel E is in a plane directly midway between the planes of the side faces of the said blade and consequently the periphery of the wheel will cut evenly in the throats of the teeth. Therefore, the shaft of the emery wheel having been adjusted so that its axis will occupy the position shown in Fig. 3 and with relation to the blade A, no further adjustment will be required while the teeth of that particular saw are being sharpened. However, if the next saw to be sharpened is of the greater thickness shown by the blade B, it is evident that should no provision be made for adjustment of the shaft, the axis X would be located in a vertical plane very close to that face of the blade contacting the face 2 of the machine bed but considerably remote from the plane occupied by the other face of the blade B. As a consequence the periphery of the emery wheel would cut unevenly into the throats of the teeth. It is obvious, therefore, that in order to obtain a perfect cut, the emery wheel shaft should be adjusted so that its axis X would occupy a vertical plane exactly midway between the side faces of the blade B, which it does in the said Fig. 3, the small arrow leading from the point indicating the axis X in this figure indicating the distance through which the said axis must be moved in order to obtain the proper adjustment. It is obvious that without some means for accurately gaging this adjustment, it would be a difficult matter to properly position the shaft, and as before stated, the primary object of the present invention is to provide such means and this means will now be described.

The device embodying the present invention includes a circular head 15 of any desired dimensions and formed axially with a circular opening 16. Into this opening there is snugly and yet rotatably fitted a bushing 17 the opening or bore of which, indicated by the numeral 18, is offset from the true axis of the head and bushing and eccentrically positioned with relation to the circumference of the bushing which is round to fit the opening. A stud 19 extends radially from the circumference of the bushing 17 at or near one end thereof and preferably at a point opposite the thickest portion of the wall of the bushing or, in other words, at a point the most remote from the axis of the opening 18. In order that the various positions of rotative adjustment of the bushing 17 may be determined and in order that the bushing may be held against rotation when brought to the desired position of adjustment, the face of the head 15 is formed radial to the opening 16 with an arcuate series of seats 20 to receive the stud 19. The purpose of the bushing 17 and its adjustment will presently be fully set forth.

Extending substantially radially from the periphery of the head 15 is a shank 21 which adjacent its point of juncture with the head is increased in width and of substantially circular form to provide a swivel head 22, the shank being continued beyond this head in alinement with its portion 21, as indicated by the numeral 23. By reference to Fig. 5 it will be observed that one face of the head 22, the shank 21, and the extension 23 of the shank occupies a plane directly radial to the axis of the head 15. The head portion 22 of the shank 21 is recessed at the opposite face of the shank, as indicated by the numeral 24, to rotatably receive a substantially circular enlargement 25 constituting the other head of the swivel joint, this enlargement being formed midway between the ends of the stock of the device, which stock is indicated by the numeral 26. The stock itself at the point of location of the swivel head 25 is also recessed in its face so that when the heads 22 and 25 are assembled, as shown in Figs. 2 and 5 of the drawings, the engaging face of the stock, indicated by the numeral 27, will occupy the same plane as the faces of the shank portions 21 and 23 and the face of the swivel head 22. Preferably the opposite face of the stock 26 is formed with a longitudinally extending reinforcing rib 28 and fitted axially through the heads 22 and 25 and through the corresponding portion of the rib 28 is a swivel bolt 29 the head 30 of which is countersunk in the face of the head 22, a wing nut 31 being applied to the opposite end of the bolt and bearing against the outer edge of the rib 28. It will now be understood that the head 15 and its stem may be swung about the bolt 29 to assume various positions of angular adjustment with relation to the stock 26 and in order that such positions of adjustment may be relatively determined in degrees, an indicating mark 32 is preferably made upon the face of the portion 23 of the stem 21 and radial degree marks, suitably designated, and indicated in the drawings by the numeral 33, are made upon the face of the head 25 and are designed, in the relative angular adjustment of the parts to register with the mark 32.

In the use of the device the gage of the saw to be sharpened having been determined, the bolts 9 of the bearings 7 are loosened, the emery wheel removed from the shaft 6 by removing the nut 14 and the washer 13. Next, the bushing 17 is slid longitudinally within the opening 16 of the head 15 in which the seats 20 are formed and rotated within the head 15 until its stud is opposite the properly designated seat. The bushing is then slipped within the opening to engage its stud in the said seat. The head is then arranged upon the shaft 6 to occupy the position formerly occupied by the emery wheel, by slipping the bushing 17 onto the end of the shaft. Then, either after or without the application of the washer 13 and nut 14, the flat face 27 of the stock 26 together with the faces of the shank portions 21 and 23 and head 22 occupying the same plane as the said face 27, are brought flatly and snugly against the face 2 of the bed of the machine and held firmly in place until the nuts 9 of the bearings 7 have been tightened. After these nuts have been tightened, thus fixing the bearings in their positions of adjustment, the head 15 is detached from the spindle and the emery wheel is then replaced in position, whereupon the machine is ready for operation.

As before stated, the shank 21 is mounted for swinging adjustment upon the stock so that the device may be employed upon both left and right hand grinding machines, both types of machines, as is well known, being in general use.

Having thus described the invention, what is claimed as new is:

1. In a device of the class described, a stock having a plane abutment face, a head carried by the stock and having an opening the axis of which occupies the same plane as the said face of the stock, and a bushing adjustably fitted in the opening and provided with an eccentrically positioned shaft receiving opening.

2. In a device of the class described, a stock having a plane abutment face, a head carried by the stock and angularly adjustable thereon and having an opening the axis of which occupies the same plane as the said face of the stock, and a bushing rotatably fitted in the opening and provided with an eccentrically positioned shaft receiving opening.

3. In a device of the class described, a stock having a plane abutment face, a head carried by the stock and disposed in a plane transversely of said face, and a bushing rotatably carried by the head and provided with an eccentrically positioned shaft receiving opening, rotation of the bushing serving to vary the position of the axis of its opening with relation to the plane of the said face of the stock.

4. In a device of the class described, a stock having a plane abutment face, a head carried by the stock, a bushing having a shaft receiving opening whose axis is eccentric to its periphery, said bushing and head being provided with interengaging parts for rotatably supporting the bushing with its true axis in the plane of the said abutment face of the stock.

5. A device of the class described including an element having a plane face, a support intersecting said plane and attached to said element, a bushing having a circular exterior and a shaft opening eccentric thereto, said support and bushing being provided with interengaging parts for adjustably mounting the bushing on the support with its true axis coincident with said plane.

6. In a device of the class described, a stock having a plane abutment face, a head carried by the stock and having an opening whose axis occupies the same plane as said face, and a round bushing rotatable in said opening and provided with a bore eccentric to its periphery.

In testimony whereof I affix my signature.

WILSON TOUPS. [L. S.]